Patented Aug. 30, 1932

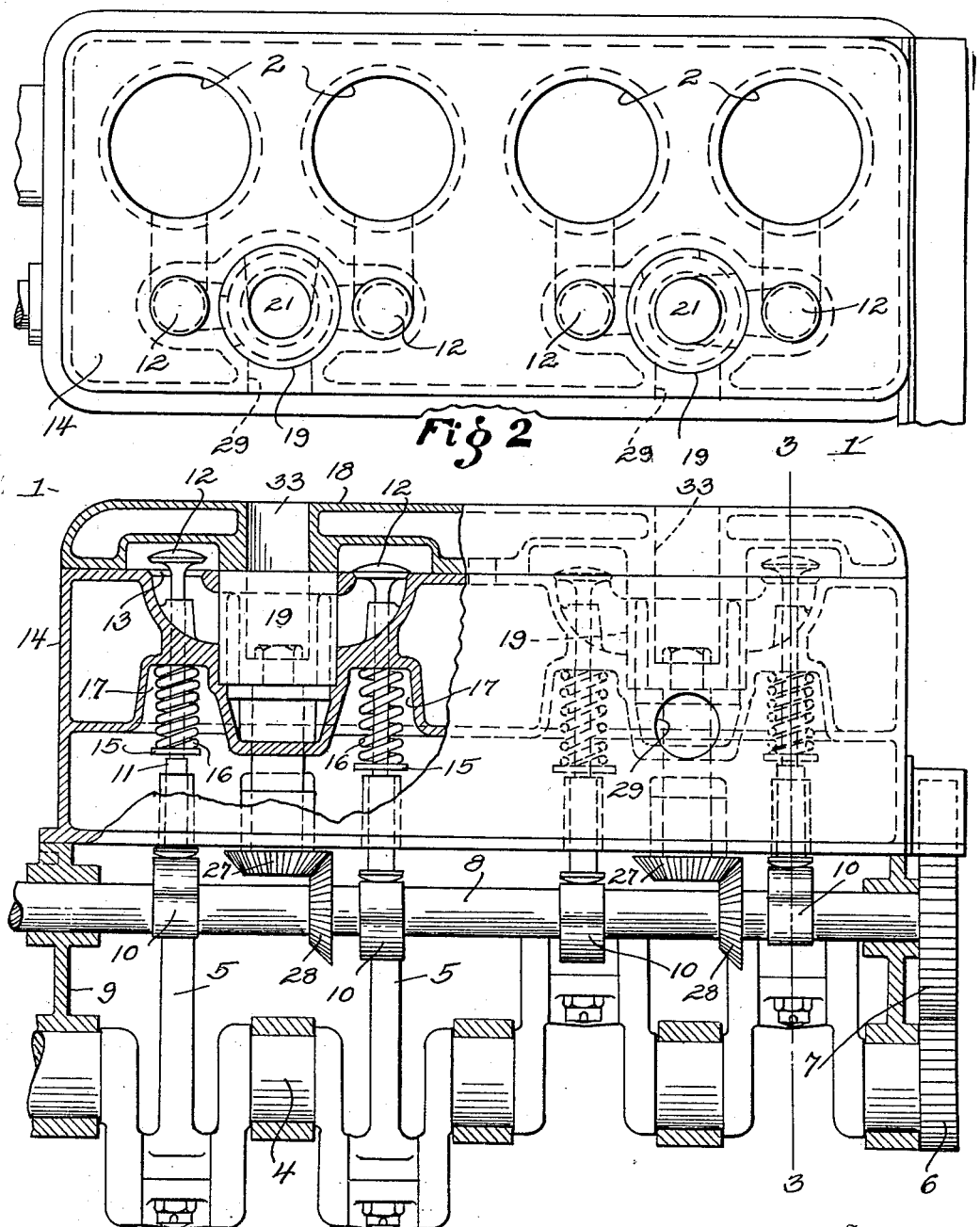

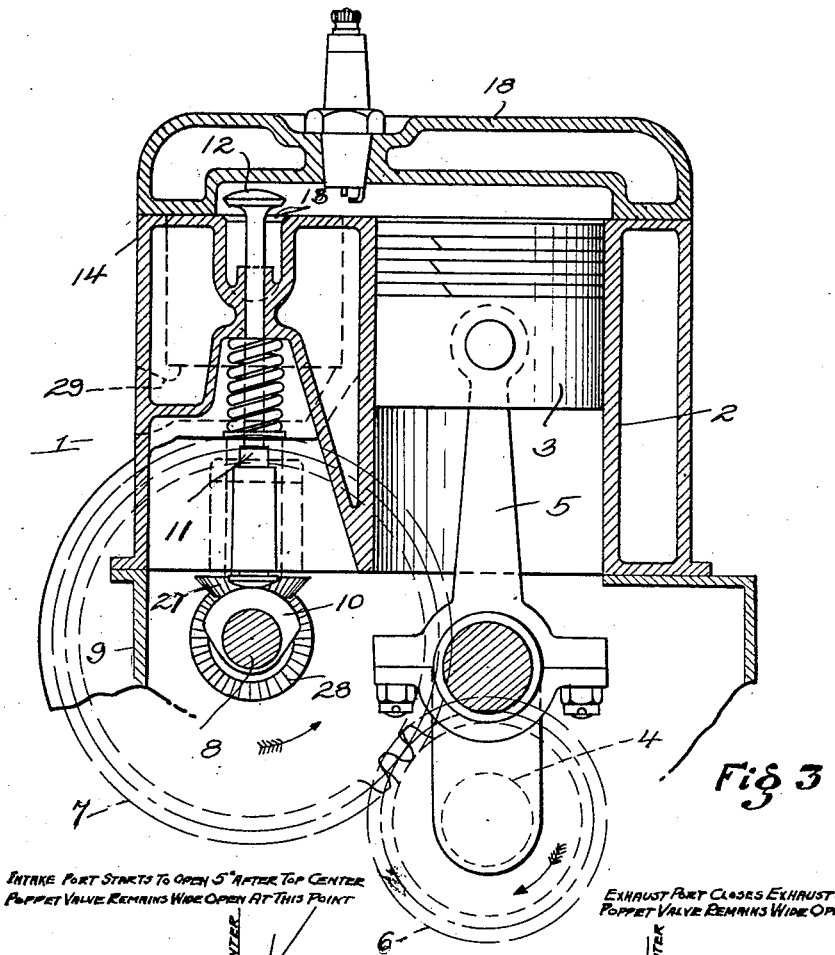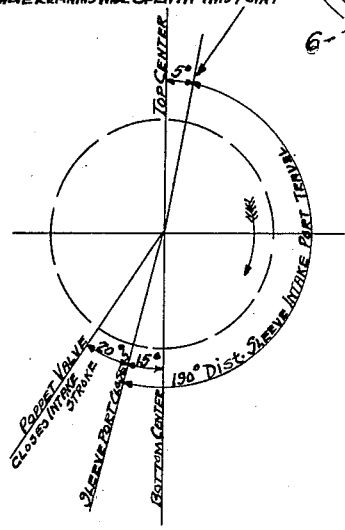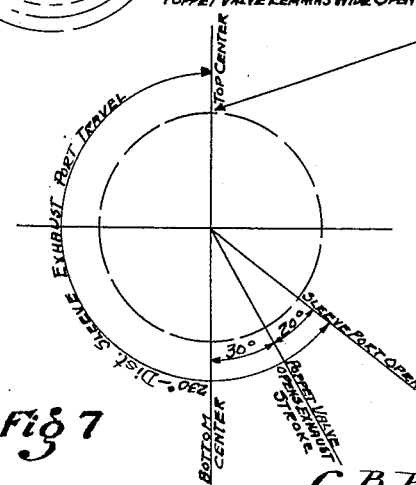

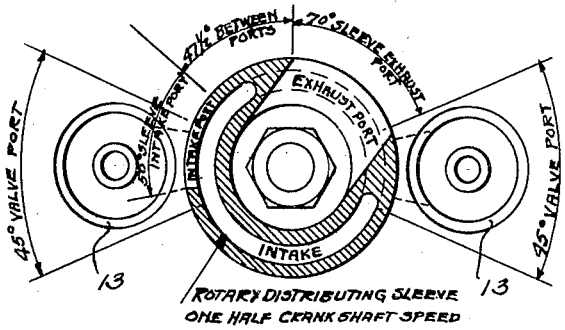
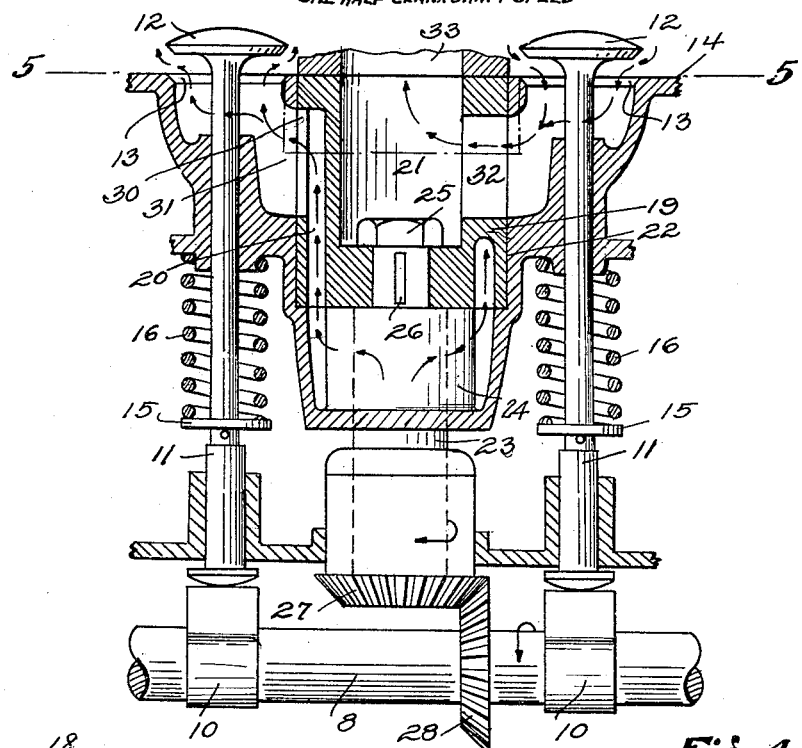
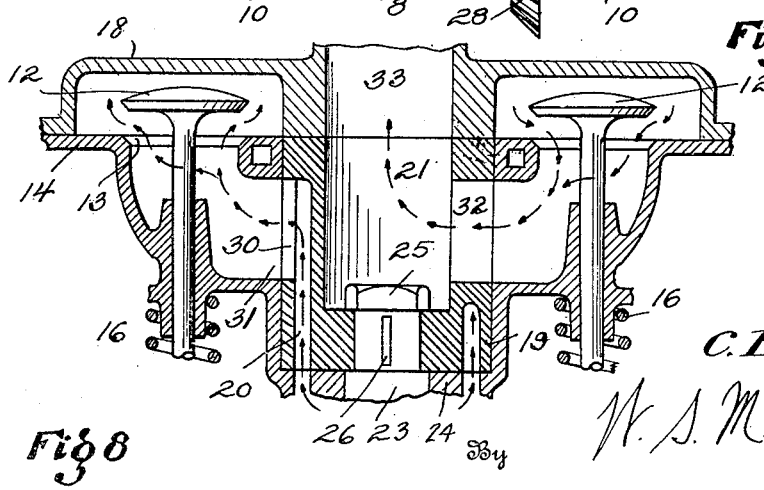

1,875,238

UNITED STATES PATENT OFFICE

CORNELIUS B. HARDMAN, OF COLUMBUS, OHIO

VALVE MECHANISM FOR INTERNAL COMBUSTION ENGINES

Application filed June 15, 1928. Serial No. 285,569.

This invention relates to improvements generally in internal combustion engines, and has particular reference to the valve mechanisms of such engines which are adapted for the purpose of controlling the intake and discharge of the fuel and exhaust gases into and from the cylinder structure of the engine.

It is a primary object of the present invention to provide a valve mechanism of simple and improved construction, embodying few working parts which, under conditions of operation, are not likely to become out of order, to be retarded in their operation by carbon deposits and to require but a minimum of attention.

Another object of the invention rests in the provision of the valve mechanism wherein a single poppet type valve is employed to control the admission of the fuel charge into and the exhaust of the burned gases from the head of the engine cylinder, and wherein is provided in connection with said valve a rotary distributor, which is constructed and operated to admit of the flow of the incoming fuel charge from the carburetor to the cylinder by way of the poppet valve and to also admit of the discharge of the exhaust or burnt gases by way of the same poppet valve to the exhaust line of the engine.

Another object of the invention resides in so placing and constructing the distributor that it may be used to regulate the admission and exhaust of gases to and from a pair of adjacent but operatively independent engine cylinders, to the end of simplifying the construction of the valve mechanism and reducing its number of parts to a minimum.

It is another object of the invention to provide a valve mechanism which will permit of the use in the engine of a motor vehicle of fuels containing hydrocarbons heavier than those of motor fuel or gasoline, and to permit these lower priced heavier fuels to be used successfully in the operation of an internal combustion engine standard with respect to compression ratios and R. P. M., this result being primarily obtained by the provision of the single poppet valve, which under the influence of the heated exhaust gases, becomes quite hot while in operation so as to heat and completely vaporize or gasify the incoming fuel charge. This arrangement is such that the temperature of the primary poppet valve constantly fluctuates: First, it is heated by the outgoing exhaust gases and then it is immediately cooled by the incoming fresh fuel gases, which reduces the temperature of the valve and prevents its overheating by reason of sustained or continuing exhaust operations. However, in cooling the valve a part of its heat is abstracted by the incoming fuel charge, which completely vaporizes or gasifies such fuel charge and reduces it to a condition where it may be so consumed upon firing and in such a manner as to prevent knock or detonation and to provide for a smooth engine operation.

Other objects rest in the provision of means whereby the rotatable distributing valve may operate freely and without undue friction: And the provision of means for positively obtaining the primary valve in an open and operative gear during both the exhaust and intake strokes of the engine piston; and constructing the distributor so as to space the intake and exhaust ports or passages provided therein so that the exhaust gas does not come into contact at any point in the sleeve valve mechanism with the fresh intake gases: And the provision of means for securing efficient heat radiation from the primary valve and other advantages and features hereinafter set forth in detail.

With these and other objects in view which will appear as the description proceeds, the invention consists in the novel features of construction, combinations of elements and arrangements of parts hereinafter to be fully described and pointed out in the appended claim.

In the accompanying drawings:

Figure 1 is a view in vertical section taken through the internal combustion engine and disclosing the valve mechanism comprising the present invention, Figure 2 is a top plan view of the engine with its cylinder head removed, Figure 3 is a vertical transverse sectional view taken through the engine on the line 3—3 of Figure 1, Figure 4 is an enlarged vertical sectional view taken through the distributor and associated parts, Figure 5 is a horizontal sectional view on the line 5—5 of Figure 4, Figure 6 is a diagrammatic view disclosing the timing of the crank shaft with respect to the intake stroke alone, Figure 7 is a similar view showing the timing of the crank shaft with respect to the exhaust stroke alone, Figure 8 is a view similar to that of Figure 4 and shows more fully the construction of the valve chambers in the cylinder head of the engine.

In the specific embodiment of the invention selected for illustration herein, the numeral 1 designates an internal combustion engine which comprises generally a plurality of longitudinally spaced vertically arranged cylinders 2, in which are slidably mounted, as usual, pistons 3 which are united with a crank shaft 4 by means of the customary connecting rods 5. The crank shaft is provided with a timing gear 6, which meshes with a larger gear 7, the latter being carried by a cam shaft 8, suitably mounted for rotation in connection with bearings formed with the crank-case structure 9 of the engine.

The shaft 8 is provided at intervals throughout its length with cams 10 so arranged as to engage with the headed lower ends of a plurality of valve stems 11, which stems at their upper ends are provided with poppet valves 12, and having one of such valves for each cylinder of the engine and this single valve is adapted to control, in connection with other associated mechanism, both the flow of fresh gas into and the discharge of the burned or exhaust gases from the cylinders 2. Each of the valves 12 is adapted to engage with a valve seat 13, which is formed in the cylinder block 14 to one side of each of the cylinders 2. The valve stems 11 operate, as usual, in vertical bearings provided in the block 14 and may be provided with collars or washers 15 with which engage coil springs 16, said springs being suitably confined in sockets 17 provided in the cylinder block so that the normal tendency of such springs is to maintain the lower headed ends of the stems 11 in constant engagement with the cams 11, requiring, as usual, the ordinary operation of the cam shaft to synchronously raise and lower the valves 12 to control the flow of gases to and from the engine cylinders. The cylinder block is provided with the usual removable head 18 which affords access to the valves 12 of the seats 13 in the customary manner.

Between each pair of valves 12 there is provided a rotary distributor 19. Each distributor comprises a metallic body of cylindrical form, which is suitably cored to provide an annular intake passage 20 and with a central or axle exhaust passageway 21, said passageways being maintained independent and rotatably separate so that the intake gases do not come into contact with exhaust gases. Each of the distributors is mounted for rotation about a vertical axis and is arranged within a well or socket 22 formed in one side of the cylinder block. The distributor is adapted to rotate freely within the well or socket 22 and is but slightly spaced from the walls of the latter to provide working clearances. Each of the distributors is rotated by means of a vertical shaft 23, suitably mounted for rotation in connection with bearings 24 formed with the block 14. The upper end of each shaft 23 is reduced and passes through a central bore provided in the lower part of each distributor sleeve 19, the reduced upper end of each shaft being provided with a nut or the like 25 to frictionally unite said sleeve with the shaft and also with a key 26, which insures uniform rotation, on the part of the sleeve and the shaft. The lower end of each of the shafts 23 is provided with a bevelled gear 27, or its equivalent which meshes with a corresponding gear 28 fixed on the cam shaft 8. It will thus be seen that the distributor sleeve and the poppet valves are synchronously operated in properly timed order from the cam shaft 8.

Entering one side of the cylinder block 14 and communicating with the lower part of each of the wells or sockets 22 is a fuel intake conduit 29, adapted to be connected with a carburetor or the like, not shown. The intake passage 20 in said distributor sleeve is in open communication at the bottom thereof with the intake conduit 29, and the outer wall of each sleeve 19 is provided with an intake port 30, so disposed that when the valve parts are situated, as shown in Figure 4, the port 30 will establish open communication for gas flow from the intake conduit 29, through the well or socket 22, thence into the intake passageway 20 of the distributor sleeve and through the port 30, and thence around the poppet valve 12 by way of the valve seat 13 and into the cylinder proper. Upon further rotation of the cam shaft it will be seen that the intake port 30 will be revolved so as to be out of registration with the passage 31 which is formed in the cylinder block immediately below each of the poppet valves 12. Upon the exhaust stroke of the piston 3 the distributor sleeve will be revolved sufficiently so that the exhaust port 32 formed therein will register with the passageway 31 so that when the poppet valve is elevated the exhaust gases may sweep past the same, through the exhaust port 32 into the exhaust passageway 21 of the distributor sleeve. This passageway aligns with a vertical exhaust outlet 33 provided in the cylinder head 18 of each of the distributor mechanisms and these outlets are adapted to communicate with an exhaust conduit of ordinary construction and form.

In view of the foregoing it will be seen that by means of the rotary distributing sleeve, both the intake and exhaust gases enter and leave the cylinder of an engine by traveling through or past the same poppet valve. The heat of the exhaust gases thoroughly vaporize the incoming fuel, as the latter passes through the heated poppet valve. It will be seen that there exists a constant interchange of heat at this point when the engine is in operation. At first, the exhaust gases leaving the engine heat the primary or poppet valve, but then the valve is immediately cooled by the sweep thereover of the incoming fuel or intake gases, these latter gases being in turn further heated by contact with the primary or poppet valve to thoroughly vaporize the mixture and to provide for efficient combustion thereof. By thus heating and then cooling the poppet valve the latter may be of especially large area without any liability of warping, burning or becoming out of order under ordinary engine operation. This results in increased power as well as lower fuel consumption, and moreover permits the motor to operate successfully on heavier hydrocarbon oil fractions than is customary to employ in ordinary internal combustion engine designs. It fact, any of the heavier fuels may be used if they possess sufficient specific gravity to carburet. The single poppet valve for each cylinder is timed to open completely upon the exhaust stroke and does not close until the completion substantially of the intake stroke, as shown in Figures 6 and 7. This feature insures a thorough scavenging or removal of the exhaust gases from the engine cylinder as well as a full and complete intake charge of the fresh fuel gases, as the poppet valve remains closed during compression and firing strokes of the piston. The poppet valve has been designed to hold all cylinder pressures, thereby relieving the distributing sleeve of this function so that the sleeve can be made to operate freely with liberal expansion clearances. The rotary distributing sleeves, of which there are one to each two cylinders, open at positions 20 degrees of crankshaft movement ahead of the poppet valve operation on the exhaust stroke. This permits unrestricted passage of exhaust gases through the sleeve. Further, the sleeve closes the exhaust stroke at a top center position and opens the intake at substantially 5 degrees after such top center position, as will be clearly apparent in the diagrammatic views set forth in Figures 6 and 7, and at this point the poppet valve is in its fully opened position. The sleeve operates to close the inflow of fuel 20 degrees of crankshaft movement before the poppet valve closes in the intake stroke, thus permitting all intake mixture in valve ports to be drawn into the cylinder. The position of the valve mechanism is such as to provide freedom in the matter of design of the head or upper portion of each combustion chamber, in order to provide various compression ratios and to, also, regulate to a certain degree engine detonation. In the form of combustion chamber disclosed, maximum turbulence is provided in the upper portion of each cylinder structure, which has a marked tendency to reduce detonation when lower grade fuels are utilized.

What is claimed is:

In an internal combustion engine, a cylinder structure including a chamber having a vertically arranged bearing at its lower end which is formed integrally with said structure and spaced from the walls thereof to provide an annular passageway, said passageway being provided with a port connecting the intake of said engine, a vertically disposed rotary valve sleeve positioned within said chamber and provided with an annular passageway in open communication and in alignment with said first named passageway, the passageway in said sleeve being provided with a port registering with ports establishing communication with a pair of cylinders in said engine, said sleeve being also formed with a centrally located passageway independent of the annular passageway in said sleeve, said centrally located passageway being closed at its lower end by the end wall of said sleeve and its upper end open to an exhaust conduit entering the upper part of said chamber, a shaft for effecting the rotation of said sleeve extending through said bearing and having a connection with the end wall of said sleeve, said valve sleeve serving upon rotation to open and close the ports communicating with said cylinder for regulating at timed intervals the intake and exhaust pulsations of said engine.

In testimony whereof I affix my signature.

CORNELIUS B. HARDMAN.